United States Patent
Bourg et al.

(10) Patent No.: US 12,176,953 B2
(45) Date of Patent: Dec. 24, 2024

(54) FIBER OPTIC NETWORKS, OPTICAL NETWORK UNITS AND METHODS FOR CONFIGURING SPLIT RATIOS OF VARIABLE RATIO COUPLERS WITHIN OPTICAL NETWORK UNITS

(71) Applicant: Corning Research & Development Corporation, Corning, NY (US)

(72) Inventors: Kevin Lee Bourg, Alpharetta, GA (US); Martin Hempstead, Painted Post, NY (US); Joseph Clinton Jensen, Lawndale, NC (US); Claudio Mazzali, Corning, NY (US); Raman Kumar Selli, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 139 days.

(21) Appl. No.: 17/974,018

(22) Filed: Oct. 26, 2022

(65) Prior Publication Data
US 2023/0136577 A1    May 4, 2023

Related U.S. Application Data

(60) Provisional application No. 63/273,401, filed on Oct. 29, 2021.

(51) Int. Cl.
*H04B 10/27*  (2013.01)
*H04B 10/40*  (2013.01)
(Continued)

(52) U.S. Cl.
CPC ............. *H04B 10/27* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 6,681,083 B1 | 1/2004 | Koonen |
| 7,450,843 B2 | 11/2008 | Persson |

(Continued)

FOREIGN PATENT DOCUMENTS

| EP | 1087556 A1 | 3/2001 |
| JP | 2007173908 A * | 7/2007 |
| WO | 2020/018657 A1 | 1/2020 |

OTHER PUBLICATIONS

Liu et al., "Variable optical power splitters create new apps", Retrieved from: https://www.lightwaveonline.com/fttx/pon-systems/article/16648432/variable-optical-power-splitters-create-new-apps, 2005, 14 pages.

*Primary Examiner* — Darren E Wolf
(74) *Attorney, Agent, or Firm* — Michael E. Carroll, Jr.

(57) ABSTRACT

Fiber optic networks, optical network units, and methods of configuring a fiber optic network and an optical network unit using a variable ratio coupler are disclosed. In one embodiment, a fiber optic network includes a feeder optical cable. The first optical network unit and the second optical network unit each includes a variable ratio coupler operable to selectively set a split-ratio among a plurality of split-ratios, and a fiber optic transceiver module. The fiber optic network further includes a first drop cable optically coupling the first optical network unit to the feeder optical cable at a first position, and a second drop cable optically coupling the second optical network unit to the feeder optical cable at a second position. A first split-ratio of the first optical network unit is based on the first position and a second split-ratio of the second optical network unit is based on the second position.

15 Claims, 10 Drawing Sheets

(51) Int. Cl.
  H04B 10/50 (2013.01)
  H04B 10/60 (2013.01)

(56) References Cited

U.S. PATENT DOCUMENTS

| | | | |
|---|---|---|---|
| 9,715,157 B2 | 7/2017 | Reuven | |
| 2005/0163508 A1* | 7/2005 | Hwang | H04J 14/02 398/71 |
| 2008/0298807 A1* | 12/2008 | Yang | H04Q 11/0067 398/98 |
| 2009/0208211 A1* | 8/2009 | Tamai | H04B 10/272 398/67 |
| 2021/0194589 A1* | 6/2021 | Kawakita | H04L 12/44 |

* cited by examiner

FIBER OPTIC NETWORKS, OPTICAL NETWORK UNITS AND METHODS FOR CONFIGURING SPLIT RATIOS OF VARIABLE RATIO COUPLERS WITHIN OPTICAL NETWORK UNITS

CROSS-REFERENCE TO RELATED APPLICATIONS

This application claims the benefit of priority of U.S. Provisional Application Ser. No. 63/273,401 filed on Oct. 29, 2021, the content of which is relied upon and incorporated herein by reference in its entirety.

FIELD

The disclosure is directed to fiber optic networks, and, more particularly, to fiber optic networks and optical network units having a variable ratio coupler at a subscriber location to reduce initial capital expenditure of installing the fiber optic network, as well as methods for configuring fiber optic networks and optical network units.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

However, installation of a fiber optic network may be costly, particularly in rural areas where the population is much less dense than in urban or suburban areas.

A fiber optic network, such as a passive optical network (PON) may be built before the number and location of subscribers is known. Initially, there may be many more homes passed than homes connected and this situation may persist, particularly in low-density areas. Nevertheless, as the system is being built, it is necessary to make sure that the homes passed can be converted into homes connected upon demand. For many system designs, this requires that expensive hardware be installed day one to provide such potential coverage to all or an acceptable fraction of homes passed. For these reasons, rural areas may be underserved with respect to broadband internet.

Consequently, there exists an unresolved need for fiber optic network configurations that have reduced up-front costs that also enable subscribers to be added on demand.

SUMMARY

The disclosure is directed to fiber optic networks and optical network units (ONUs) having a variable ratio coupler to reduce initial capital expenditure of installing the fiber optic network, as well as methods for configuring fiber optic networks and ONUs. The VRCs may be automatically adjustable so that the subscriber receives the optimum optical power. Because all the equipment for connecting a subscriber is installed at the time of subscriber connection, the initial cost of deploying the fiber optic network is reduced.

In one embodiment, a fiber optic network includes a feeder optical cable operable to be optically coupled to an optical line terminal, a first optical network unit, and a second optical network unit. Each of the first optical network unit and the second optical network unit include a variable ratio coupler operable to selectively set a split ratio among a plurality of split ratios, and a fiber optic transceiver module. The fiber optic network further includes a first drop cable optically coupling the first optical network unit to the feeder optical cable at a first position, and a second drop cable optically coupling the second optical network unit to the feeder optical cable at a second position. A first split ratio of the first optical network unit is based on the first position and a second split ratio of the second optical network unit is based on the second position.

In another embodiment, an optical network unit for installation in a fiber optic network includes a variable ratio coupler operable to provide a split ratio among a plurality of split ratios, a fiber optic transceiver module, an actuator, and a controller. The controller receives a power signal corresponding to optical power level that is received by the optical network unit and controls the actuator to set the split ratio based at least in part on the optical power level.

In yet another embodiment, a method of configuring a fiber optic network includes optically coupling an optical network unit to a feeder optical cable using a drop cable. The optical network unit includes a variable ratio coupler operable to automatically and selectively set a split ratio among a plurality of split ratios after being optically coupled to the feeder optical cable, and a fiber optic transceiver module. The method further includes installing the optical network unit at a subscriber location.

In yet another embodiment, a method of configuring an optical network unit installed at a subscriber location includes detecting an optical power of an input optical signal inputted into the optical network unit, determining, by a controller within the optical network unit, a split ratio of a variable ratio coupler within the optical network unit based on the optical power, and adjusting, by an actuator controlled by the controller, the variable ratio coupler to split the input optical signal according to the split ratio such that a first portion of the input optical signal is provided to a subscriber and a second portion of the input optical signal is provided downstream on a feeder optical cable.

A fiber optic network includes a feeder optical cable operable to be optically coupled to an optical line terminal, and an optical network unit. The optical network unit includes a variable ratio coupler operable to selectively set a split ratio among a plurality of split ratios, and a fiber optic transceiver module. The fiber optic network further includes a drop cable optically coupling the optical network unit to the feeder optical cable at a first position. The split ratio is such that a portion of an optical signal entering the optical network unit from the feeder optical cable and through the drop cable is provided back to the feeder optical cable from the optical network unit through first drop cable.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The

DETAILED DESCRIPTION

References will now be made in detail to the embodiments of the disclosure, examples of which are illustrated in the accompanying drawings. Whenever possible, like reference numbers will be used to refer to like components or parts.

The concepts disclosed are related to fiber optic networks, and more particularly, to fiber optic networks and optical network units (ONUs) having a variable ratio coupler at a subscriber location to reduce initial capital expenditure of installing the fiber optic network, as well as methods for configuring fiber optic networks and ONUs.

Traditional fiber optic networks, such as passive optical networks, are very costly upfront to install because they require the installation of optical distribution network units (i.e., 1×N symmetric splitters), mid-span access points, and other equipment for all potential subscribers before such subscribers subscribe to the fiber optic network. Requiring the up-front installation of such equipment is particularly costly in rural areas where the population is less dense compared to urban and suburban areas.

Embodiments of the present disclosure reduce the initial costs of installing a fiber optic network by deferring equipment installation until the point of individual subscribers subscribing to the network rather than requiring the installation of equipment upon initial installation of the fiber optic network.

Figure 1:
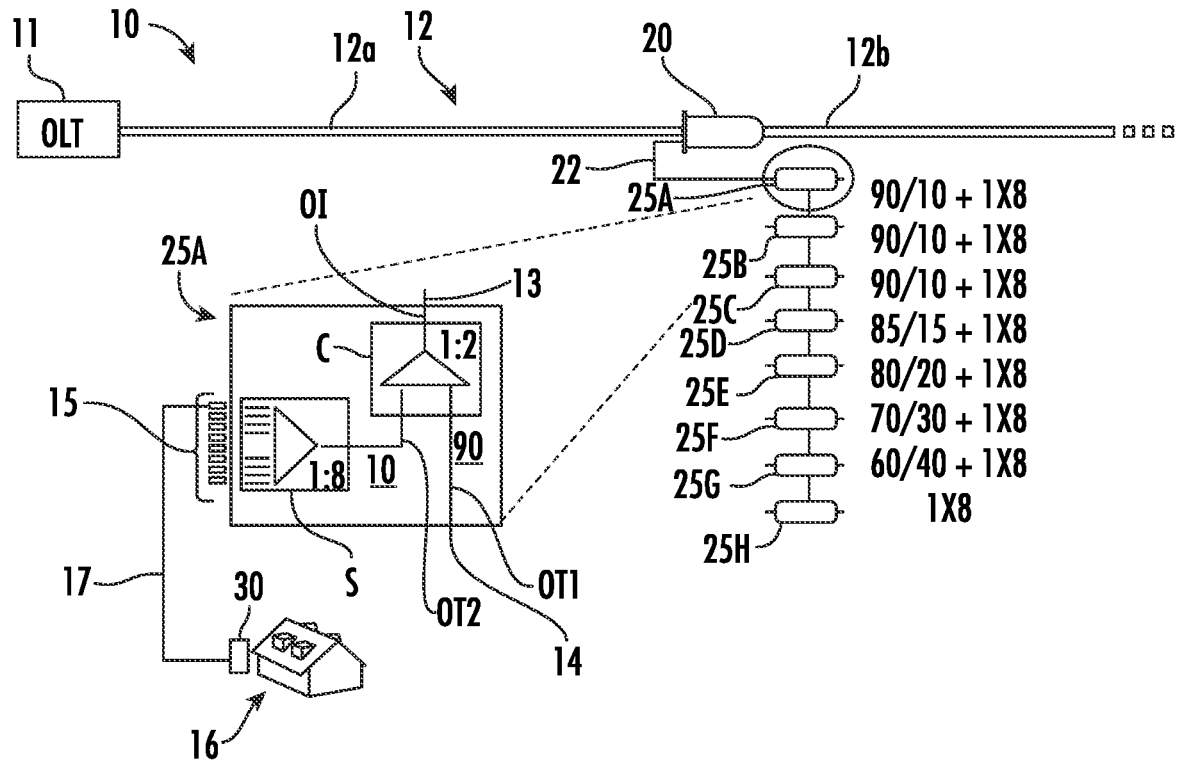
FIG. 1 schematically illustrates an example fiber optic network.

Referring now to FIG. 1, a traditional passive fiber optic network 10 is schematically illustrated. Generally, the fiber optic network 10 includes an optical line terminal 11 (OLT), a feeder optical cable 12, a plurality of mid-span access points (only one is shown in FIG. 1 for ease of illustration) and a plurality of splitter terminals 25A-25H, and a plurality of ONUs 30 at a plurality of subscriber locations (e.g., homes, offices, government buildings, and the like).

The OLT 11 originates the fiber optic network 10 and may be configured as a switch at a service provider office, for example. Electrical signals representing data to be communicated are converted into optical signals that propagate on the feeder optical cable 12. At various locations, a mid-span access point 20 is spliced into the feeder optical cable 12. In this manner, the feeder optical cable 12 is segmented into segments (e.g., 12a, 12b, etc.). A spliced optical fiber leg 22 is provided from the mid-span access point as an input to an individual splitter terminal of the plurality of splitter terminals 25A-25H.

FIG. 1 illustrates a first splitter terminal 25A in greater detail. The first splitter terminal 25A has an input 13 coupled to a spliced optical fiber leg 22 from the feeder optical cable 12, a first output 14 that provides a downstream portion of an optical input signal back to the feeder optical cable 12 and to a second splitter terminal 25B, and a plurality of second outputs 15. Inside of the first splitter terminal is a coupler C and a 1×8 splitter S. The coupler C, which may be a fused biconic taper coupler, for example, includes an optical input OI coupled to the input 13, a first optical output OT1 coupled to the first output 14, and a second optical output OT2 coupled to the 1×8 splitter S. The coupler C splits the incoming input optical signal at the optical input OI into a first portion of the input optical signal at the first optical output OT1 and a second portion of the input optical signal at the second optical output OT2. As shown in FIG. 1, the split ratios for the couplers C of the various splitter terminals 25A-25H are 90/10, 85/15, 80/20, 70/30, and The percentage of the second portion of the optical signal provided to subscribers is increased further down the feeder optical cable 12 because the amount of optical power is reduced after each splitter terminal. The last splitter terminal 25H in the chain may not have a coupler C, or the coupler C may be bypassed.

The second optical output OT2 is optically coupled to the 1×8 splitter S. It should be understood that a 1×N splitter S may be provided, and that embodiments disclosed herein are not limited to 1×8 splitters. The 1×8 splitter S splits the second portion of the input optical signal provided by the coupler C into eight subscriber optical signals that are then provided to eight subscriber locations.

In the example of FIG. 1, one of the second outputs 15 is coupled to an ONU 30 at a subscriber location 16. As is known in the art, the ONU 30 is installed at the subscriber location 16, such as on an exterior wall of a structure of the subscriber location 16 or within a structure of the subscriber location 16. As used herein "at the subscriber location" means a location that is located on a subscriber property. In some cases, the ONU 30 is installed directly on a building of the subscriber location, such as a house. In other cases, the ONU 30 may be provided on a telephone pole, a mail box, or some other structure on the subscriber's property. In these cases, the optical signal may be provided to the building by wireless signals, such as WiFi or free-space optics. No matter the location of the ONU 30 on the subscriber's property, the ONU 30 is electrically powered by any source (e.g., battery, solar, the grid, and/or the like).

The ONU 30 is operable to convert optical signals from the 1×8 splitter S into electrical signals that are then provided to communications equipment at the subscriber location 16. The ONU 30 also includes a transmission module (not shown) that converts electrical signals from communications equipment at the subscriber location 16 into optical signals to propagate back to the OLT 11 over the feeder optical cable 12, thereby providing bi-directional optical communication.

There are disadvantages to the passive fiber optic network 10 depicted by FIG. 1. One of the risks in installing a passive fiber optic network is that the system is built before the number and locations of subscribers is known. Initially, there may be many more homes passed (HPs) than homes connected (HCs). Nevertheless, as the system is being built, the HPs should be converted into HCs upon demand. For example, on a residential street having eight houses on one side of the street, house number one and house number eight may be subscribed to the service provided by the fiber optic network (i.e., they are HCs). Homes number two through seven are HP but may decide to subscribe at a later date. For many system designs, this requires that expensive hardware be installed on day one to provide such potential coverage to all or an acceptable fraction of HPs. For example, in a distributed tap architecture (DTA) (also known as an asymmetric tap architecture) such as shown in FIG. 1, splitter terminals containing 1×2 couplers and 1×N splitters, with associated connectors, are typically installed at each cluster of HPs. In a standard DTA system, the drop ratio for each subscriber is defined by that subscriber's position in the chain, which would not be known on the day of installation for a fiber optical cable that passes more potential drop points than can be serviced by the OLT and where subscribers are not already signed up.

This additional equipment that is required upfront, and which may go unused, significantly increases the cost of the installation of the fiber optic network particularly in rural areas with low population density. The costs of serving customers in these kinds of locations can be very high, and even with government subsidies it may be prohibitively expensive to provide fiber connections to potential subscribers.

Embodiments of the present disclosure provide a DTA fiber optic network that significantly reduces the cost for installing the fiber optic network, particularly in rural locations, by enabling the installation of equipment at the time of subscribers being connected to the fiber optic network rather than requiring the installation of all of the equipment up front prior to subscribers being connected. Particularly, embodiments eliminate the need for splitter terminals, and subscribers receive the required portion of the optical signal propagating in the feeder optical cable directly from the feeder optical cable. As will be described in more detail below, a variable ratio coupler is provided in an ONU at the subscriber location. As used herein, "variable ratio coupler" means a device wherein an output power level between two outputs may be adjusted to many different power level splits (i.e., "split ratios") across the spectrum of output power levels so that the power level split may be tuned or changed as needed. In some embodiments, there are discrete split ratios that are available for selection. In other embodiments, there is a continuous range of split ratios that may be selected, such as with a closed-loop control system that automatically dials-in the optimal split ratio based on received optical power. Accordingly, the split ratio of the variable ratio coupler may dynamically adjusted such that the subscriber receives the amount of optical power needed for communication on the fiber optic network. By including a variable ratio coupler in the ONU, it can be dynamically adjusted in response to changing fiber optic network conditions by an actuator that is electrically powered by an electrical power connection. Fiber optic network conditions may be due to, but not limited to, adding or removing subscribers to the fiber optic network, a change in optical signal power provided to the optical feed cable, and a changing of OLT hardware.

Figure 2:
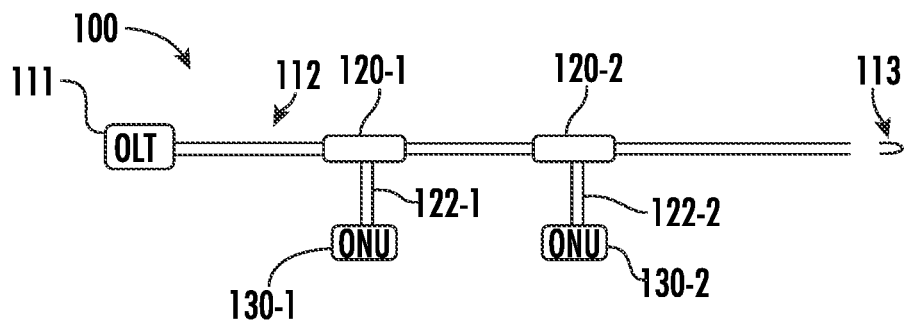
FIG. 2 schematically illustrates an example fiber optic network having one or more optical network units with a variable ratio coupler according to one or more embodiments described and illustrated herein.

Referring now to FIG. 2, a non-limiting fiber optic network 100 is schematically illustrated. The fiber optic network 100 generally includes an OLT 111 (e.g., a switch), a feeder optical cable 112, and one or more sets of a mid-span access point, a drop cable, and an ONU. The feeder optical cable 112 may be provided in many different configurations. In one example, the feed optical cable 112 includes one active optical fiber that propagates optical signals, and one loop-back optical fiber that may be utilized in the event the active optical fiber fails. The loop-back optical fiber may not be terminated in a port of the OLT 111, or it may be terminated in a port of the OLT. When needed, the loop-back fiber may be activated by either plugging the loop-back optical fiber into a port of the OLT 111, or activating the OLT port connected to it in the event that the loop-back optical fiber is already terminated in a port of the OLT 111. Any number of active optical fibers and/or loop-back optical fibers may be provided in a single feeder optical cable 112. In an example, two or more active optical fibers may be provided, and subscribers may be interleaved on the two or more active optical fibers. In other words, adjacent subscribers may be connected to separate active optical fibers in the feeder optical cable 112.

In the illustrated embodiment, there are two subscribers that are connected (e.g., two HCs), and therefore a first mid-span access point 120-1 optically coupled to a first ONU 130-1 by a first drop cable 122-1 and a second mid-span access point 120-2 optically coupled to a second ONU 130-2 by a second drop cable 122-2. Drop cables (e.g., first drop cable 122-1 and second drop cable 122-2) have two optical fibers within them (one for the upstream connection to the OLT and one for the downstream connection to the next subscriber). It should be understood that embodiments are not limited by the number of subscribers. Each of the mid-span access points, drop cables, and ONUs are deferrable costs that are required only when a subscriber is connected to the network. Therefore, the example fiber optic network 100 of FIG. 2 is much less costly to initially install than the fiber optic network 10 of FIG. 1. Equipment is installed as subscribers join the fiber optic network.

The example fiber optic network 100 further includes an optional loopback 113 that provides an optical path back to the OLT 111 which provides a redundant system capable of operating in the event that a drop cable is cut or the feeder optical fiber is cut.

Figure 3:
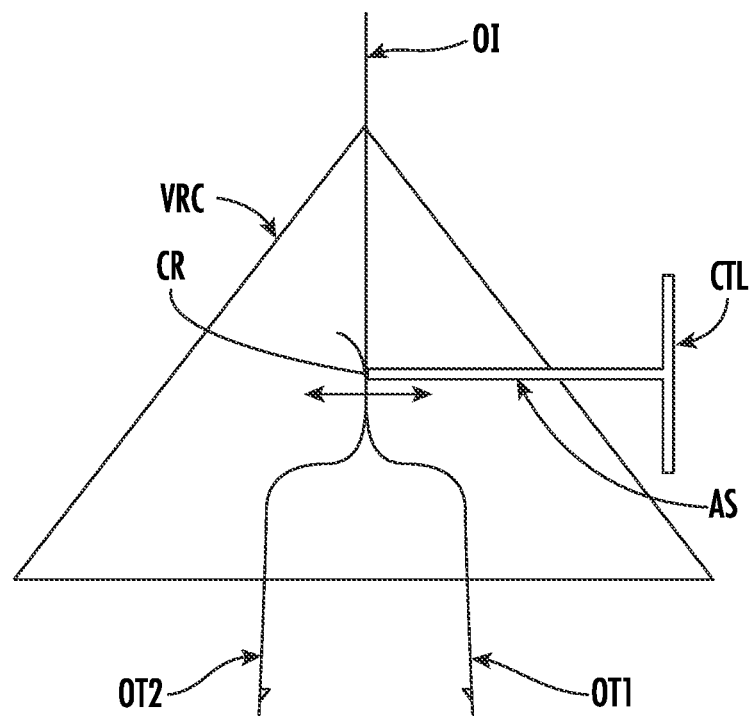
FIG. 3 is a schematic representation of an example variable ratio coupler depicted in the optical network units of FIG. 2 according to one or more embodiments described and illustrated herein.

As stated above, each ONU (e.g., the first ONU 130-1 and the second ONU 130-2 shown in FIG. 2) includes a variable ratio coupler (VRC) that has a split ratio such that each subscriber receives an optical signal at the appropriate power level. FIG. 3 is a schematic representation of the VRC provided in an ONU according to embodiments of the present disclosure. As depicted, the VRC comprises an optical input (OI) that has its output power level split between a first optical output (OT1) and a second optical output (OT2) at a coupling region (CR), with the control (CTL) for changing the output power level between the first and second outputs (OT1, OT2). The coupler may be a planar lightwave circuit (PLC) or multiclad coupler (MC) as known in the art, but other suitable structures may be used. The optical input (OI) and the optical outputs (OT1, OT2) are optical waveguides such as optical fibers that may be in optical communication with the respective input and outputs of the planar lightwave circuit or another type of device. Control (CTL) may be actuated (e.g., by a servo motor, as described below) for changing the output power level between the first optical output (OT1) and the second optical output (OT2) by any suitable means at the coupling region (CR). In an alternative embodiment, the VRC could be an electrically actuated solid-state device rather than a mechanically actuated device.

The coupling region (CR) is the region where a portion of the first optical waveguide of the first optical output (OT1) and a portion of the second optical waveguide of the second optical output (OT2) are in optical (e.g., intimate) contact for allowing the changing of the output power level of the optical signals transmitted by the first optical output (OT1) and the second optical output (OT2). More specifically, the control (CTL) is configured for individually moving a portion of the first optical waveguide of the first optical output (OT1) (or alternatively moving a portion of the second optical waveguide of the second optical output (OT2)) at the coupling region (CR) as represented by the horizontal line with the arrows on the ends. The individual movement of the first or second optical waveguide with the control (CTL) may bend, deflect or change the geometry between the portion of the first optical waveguide of the first optical output (OT1) and the portion of the second optical waveguide of the second optical output (OT2) at the coupling region (CR) (i.e., an amount of deflection of the coupling region) for changing the output power level of the optical signals transmitted by the first optical output (OT1) and the second optical output (OT2). In further embodiments, the portion of the first optical waveguide and the portion of the second optical waveguide are fused together at the coupling region (CR) and the coupling ratio may be changed, for example, by bending the fused region. Other constructions are possible for the coupling region (CR) for changing the output power level of the optical signals transmitted by the first optical output (OT1) and the second optical output (OT2). For instance, other embodiments may change the index of refraction of the materials in or around the coupling region (CR). It should be understood that embodiments described herein are not limited by the method of changing the split ratio, such as those described in U.S. Pat. No. 7,627,214, for example.

In the fiber optic network 100 of FIG. 2, no splitter terminals (e.g., splitter terminals 25A-25H) are utilized as compared to the fiber optic network 10 illustrated by FIG. 1. Rather, in the fiber optic network 100 of FIG. 2, the precise amount of optical power is provided to each individual subscriber directly by the VRCs of the ONUs 130-1 (e.g., the first ONU 130-1 and each ONU 130-2).

Still referring to FIG. 2, the first mid-span access point 120-1, the first drop cable 122-1, the first ONU 130-1, the second mid-span access point 120-2, the second drop cable 122-2, and the second optical network 130-2 are all deferrable costs that do not need to be expended when the feeder optical cable 112 is installed. Rather, an individual mid-span access point, an individual drop cable, and an individual ONU are installed only when a subscriber subscribes to the network and becomes a home connected (HC). Thus, the ONUs described herein represent significant cost savings for fiber deployment.

FIGS. 4-8 illustrate an evolution of a fiber optic network 100 as subscribers are added using the VRCs in the respective ONUs to maintain the correct optical power levels in the ONUs.

Figure 4:
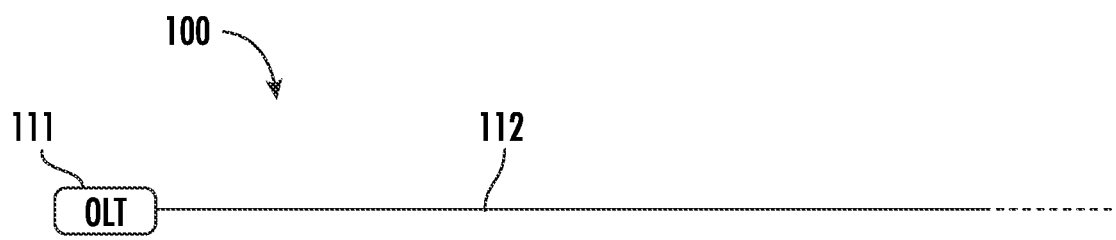
FIG. 4 schematically illustrates an initial installation of an example feeder optical cable of a fiber optic network according to one or more embodiments described and illustrated herein.

Referring now to FIG. 4, a feeder optical cable 112 that is optically coupled to an OLT 111 is installed within a service area. Depending on the service area, the feeder optical cable 112 may be installed above-ground or below ground. The feeder optical cable 112 can pass more potential subscribers than can be supported by one OLT 111, but the use of the VRC enables the service provider to avoid up-front commitment to which homes or businesses will be offered service. Further, the feeder optical cable 112 of the embodiments of the present disclosure may have a much lower fiber count than traditional systems that use centralized or distributed splitting technology (e.g., 1 fiber for up to 32 subscribers spread anywhere along the length of the feeder optical cable 112).

Figure 5:
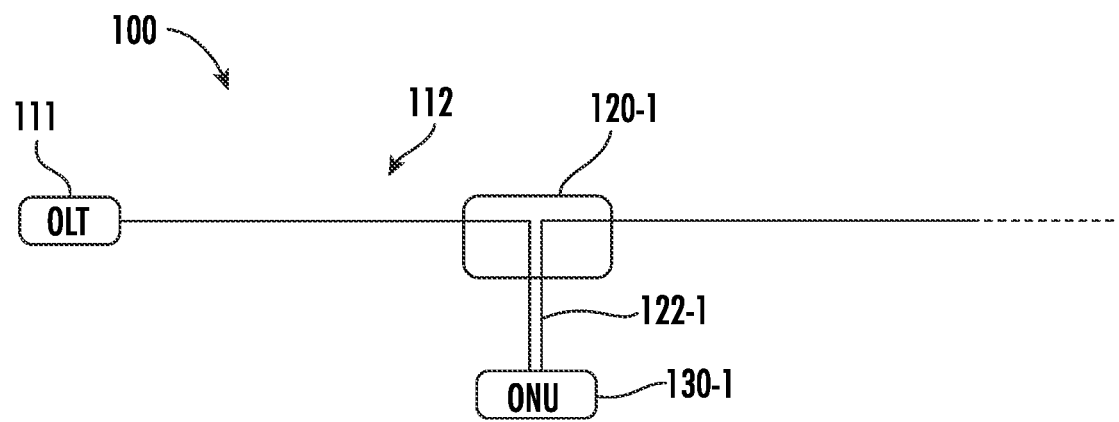
FIG. 5 schematically illustrates one subscriber connected to the fiber optic network of FIG. 4 according to one or more embodiments described and illustrated herein.

Referring now to FIG. 5, somewhere along the line of the feeder optical cable 112 an initial subscriber signs up for service to the optical network. A first drop cable 122-1 (having two optical fibers) is optically coupled to the feeder optical cable 112 at a first mid-span access point 120-1. The first mid-span access point may be a mechanical splice wherein the optical fibers of the first drop cable 122-1 are spliced to the feeder optical fiber of the feeder optical cable 112. Additionally, a first ONU 130-1 is installed at the subscriber location, which may be on an exterior wall of a structure at the subscriber location (e.g., an exterior wall of a house) or within the structure at the subscriber location. The first ONU 130-1 includes both a VRC and an optical transceiver module 134 (see FIG. 11). The optical transceiver module receives optical signals from the feeder optical cable 112 via the VRC and converts those optical signals into electrical signals provided to the subscriber, and also converts electrical signals from the subscriber into optical signals that are propagated back onto the feeder optical cable 112. The VRC in the first ONU 130-1 automatically adjusts the split ratio so that the correct optical power from the OLT 111 is provided to the optical transceiver module 134.

Figure 6:
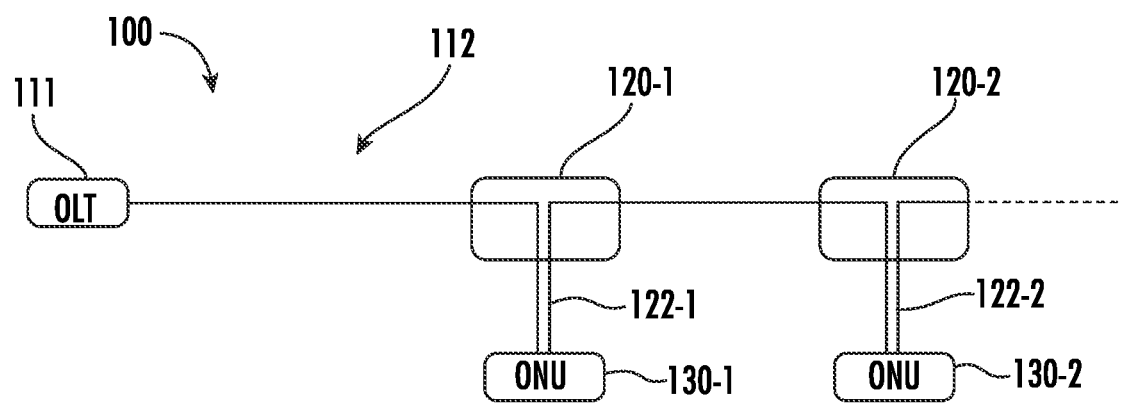
FIG. 6 schematically illustrates two subscribers connected to the fiber optic network of FIG. 4 according to one or more embodiments described and illustrated herein.

In FIG. 6, a second subscriber has signed up for service and is connected to the fiber optic network. A second drop cable 122-2 is optically coupled to the feeder optical cable 112 at a second mid-span access point 120-2 that is downstream from the first mid-span access point 120-1. A second ONU 130-2 is installed at the subscriber location and is optically coupled to the second drop cable 122-2. The VRC in the second ONU 130-2 adjusts the split ratio correctly so that the optical transceiver module 134 receives the proper optical power. With the upstream optical loss at the first ONU 130-1, the downstream optical power at the second ONU 130-2 is less than at the first ONU 130-1 and thus the VRC of the second ONU 130-2 automatically sets a higher tap ratio (i.e., split ratio) than at the first ONU 130-1.

In some embodiments, the installed ONU provides a status indication as to whether or not it has been installed and configured correctly. For example, a light emitting diode may provide a visual indication as to its status. As a non-limiting example, a flashing green light may indicate that the installation is successful while a flashing red light may indicate an error in the installation and configuration. Any type of visual or auditory indication may be provided.

Figure 7:
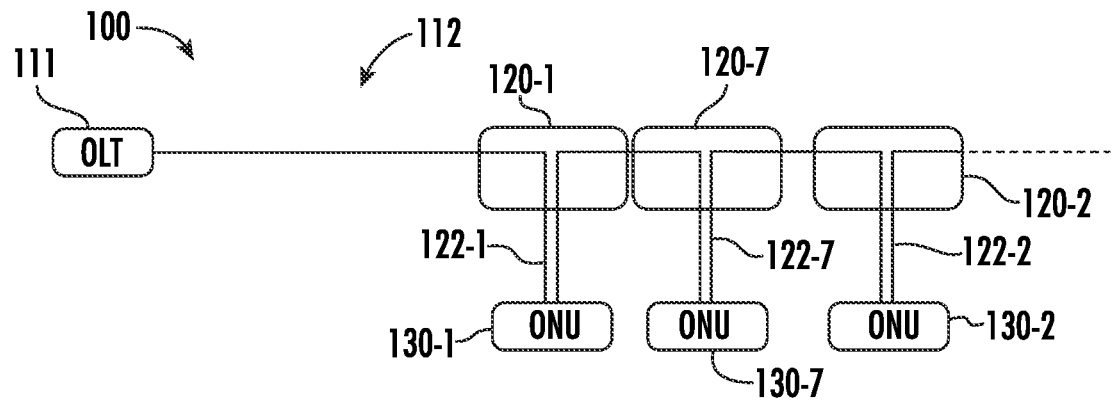
FIG. 7 schematically illustrates seven subscribers connected to the fiber optic network of FIG. 4 according to one or more embodiments described and illustrated herein.

Referring now to FIG. 7, four additional subscribers have signed up for service downstream from the second subscriber. Third through sixth subscribers are not shown because they are downstream of the second subscriber and their connections do not affect the VRC setting of the first subscriber and the second subscriber. However, a seventh subscriber between the first subscriber and the second subscriber signs up for service and is connected. A seventh drop cable 122-7 is optically coupled to the feeder optical cable 112 at a seventh mid-span access point 120-7 that is downstream from the first mid-span access point 120-1 but upstream from the second mid-span access point 120-2. A seventh ONU 130-7 is installed at the seventh subscriber location. The VRC of the seventh ONU 130-7 automatically sets the split ratio to deliver the correct level of received optical power. The split ratio will be similar to the split ratio of the second ONU 130-2 prior to connection of the seventh ONU 130-7. The split ratio of the first ONU 130-7 is unaffected by the connection of the seventh ONU 130-7, but second through sixth ONUs see a drop in received optical power due to the additional optical loss caused by the seventh ONU 130-7. The split ratios of the second through sixth ONUs will automatically adjust to compensate for the reduced optical power that is received.

Figure 8:
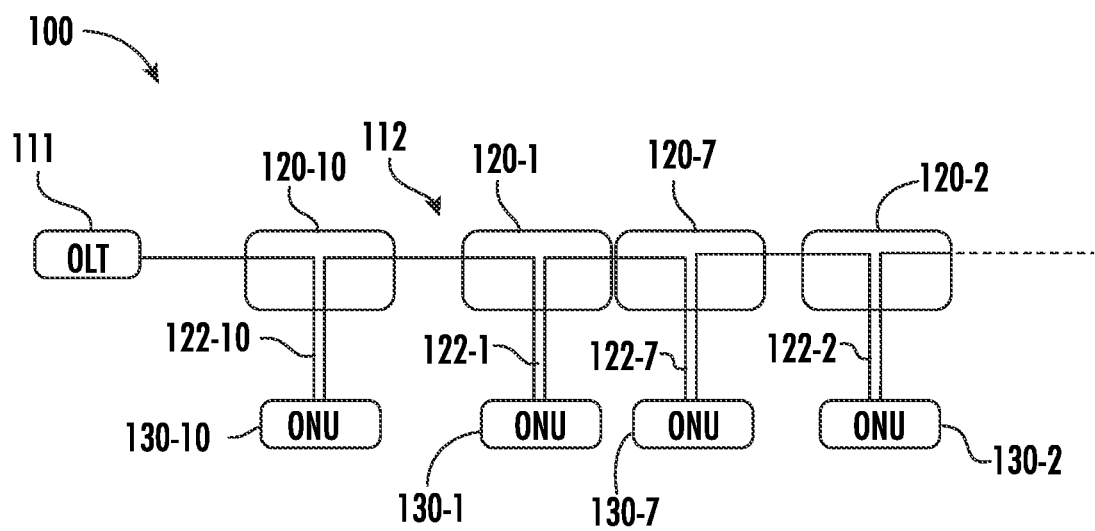
FIG. 8 schematically illustrates ten subscribers connected to the fiber optic network of FIG. 4 according to one or more embodiments described and illustrated herein.

Referring now to FIG. 8, an eighth subscriber and a ninth subscriber (not shown) are connected downstream from the second subscriber. A tenth subscriber is connected upstream from the first subscriber. Accordingly, a tenth drop cable 122-10 is optically coupled to the feeder optical cable 112 at a tenth mid-span access point 120-10. A tenth ONU 130-10 is installed at the tenth subscriber location and optically coupled to the tenth drop cable 122-10. The tenth subscriber is connected closer to the OLT 111 than any other subscriber. Accordingly, the VRC of the tenth ONU 130-10 will provide a split ratio that is similar to the first ONU 130-1 prior to the connection of the tenth ONU 130-10. With the tenth ONU 130-10 connected, all other ONUs receive reduced optical power from the OLT 111 due to the added loss from connecting the tenth subscriber, and their corresponding VRCs will compensate by adjusting to a higher split ratio.

Once an individual feeder optical fiber of the feeder optical cable 112 is at full capacity, further subscribers on the same route can be connected to another feeder optical fiber in the feeder optical cable 112 and serviced by another OLT 111 port at the central office. Churn in the network can be handled easily with the VRC-containing ONUs— a subscriber dropping service anywhere on the line opens a space for another subscriber at any other logical position on the line, with the VRCs adjusting to maintain correct received power levels.

With this incremental growth approach, the OLT 111 and ONU source lasers could be operated below maximum power until the DTA system is filled to capacity, which would reduce the carbon footprint of the system and extend the operating life of the equipment.

Figure 9:
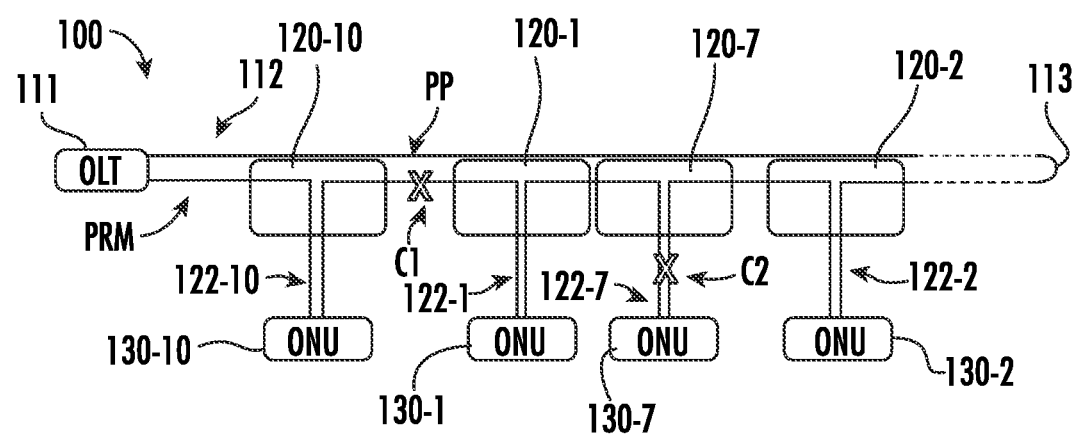
FIG. 9 schematically illustrates the fiber optic network of FIG. 8 with a protection path and two cuts in the fiber optic network according to one or more embodiments described and illustrated herein.

Referring now to FIG. 9, a scheme for path protection using a loopback at the end of the feeder optical cable 112 is illustrated. The fiber optic network 100 has ten subscribers as is the case illustrated by FIG. 8. However, a loopback 113 is used to provide a protection path PP back to a second port of the OLT 111. Thus, a primary path PRM is coupled to a first port of the OLT 111 and the protection path PP is coupled to a second port of the OLT 111. If a single cut, such as cut C1 or C2 occurs as shown at a subscriber drop cable or between two subscribers in the feeder optical cable 112, the protection path, which is connected to a second OLT port, may be used to serve subscribers downstream of the cut. This scheme requires a bi-directional ONU, as described in more detail below. After the protection switch is complete, signals for subscribers downstream of the cut will be propagating in the opposite direction and the VRC setpoints for these subscribers will in general have to change to compensate for the different loss in this protection path PP. The protection path PP will generally have higher loss because of the greater fiber length, but if there is sufficient power, the entire string of subscribers can be serviced from the OLT protection port if the primary port fails. The second OLT port is shown here at the same physical OLT, but it could be a separate piece of equipment or even at a separate location entirely. The protection path PP can also be used to allow addition of a new subscriber with minimal downtime to the service for existing subscribers.

Figure 10A:
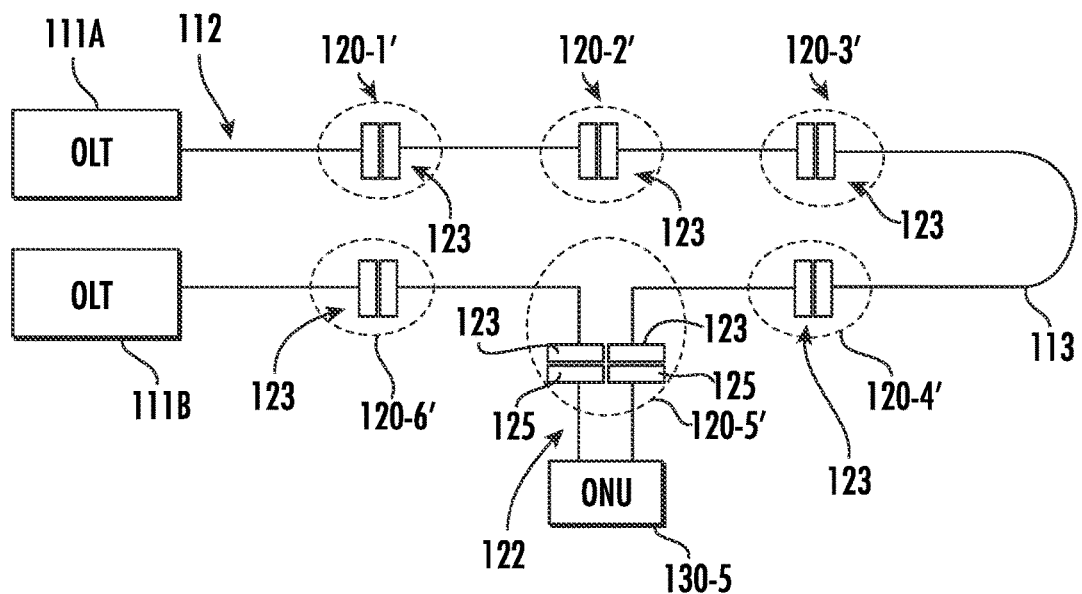
FIG. 10A schematically illustrates an example fiber optic network where the mid-span access points have mated connectors according to one or more embodiments described and illustrated herein.

As stated above, the mid-span access points 120 may be fusion splices where the active optical fiber of the feeder optical cable is spliced to optical fibers of the drop cable 122. However, the mid-span access points 120 may also utilize connectors. FIG. 10A illustrates an embodiment wherein the feeder optical cable 112 passes by six potential subscribers. The feeder optical cable 112 is coupled to a primary OLT 111A and a secondary OLT 111B that may be utilized if needed (e.g., if there is a cut along the primary feeder optical cable 112 or a drop cable 122; in this embodiment, subscribers have bidirectional ONUs). There are six access points (120-1', 120-2', 120-3', 120-4', 120-5', 120-5') in the form of two mated optical connectors. Each access point (collectively 120') is located proximate a potential subscriber's premises. When a premise becomes a subscriber, the installer merely disconnects the two connectors 123 and connects them to drop cable connectors 125 of a drop cable 122. In the illustrated example, only the fifth home is a subscriber while the other five homes are not subscribers. Thus, the drop cable connectors 125 of the drop cable 122 connected to ONU 130-5 are connected to the connectors 123 on the feeder optical cable 112.

Figure 10B:
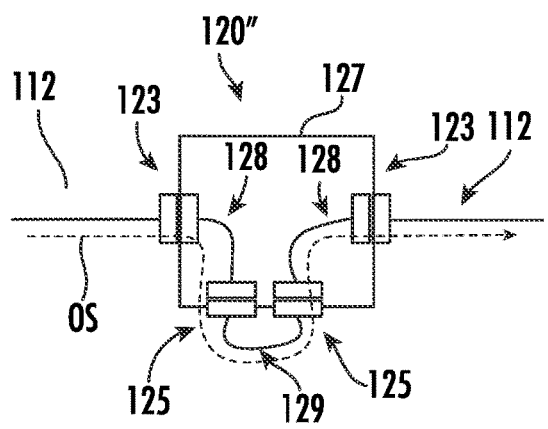
FIG. 10B schematically illustrates a terminal box providing a mid-span access point wherein no subscriber is connected according to one or more embodiments described and illustrated herein.
Figure 10C:
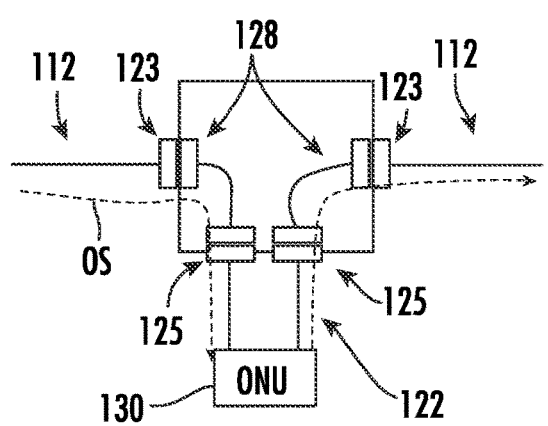
FIG. 10C schematically illustrates the terminal box of FIG. 10B wherein a subscriber is connected at the terminal box according to one or more embodiments described and illustrated herein.

The connectors 123 may be connected to two ends of the feeder optical cable 112, or provided within a terminal box. FIGS. 10B and 10C illustrate the connectors 123 provided on a terminal box 127. There are two pairs of connectors 123 on the terminal box 127 with one of each pair being on the exterior of the terminal box 127 and a second of each pair being on an interior of the terminal box 127. Within the terminal box 127 are two jumpers 128 having a connector 123 at one end and a drop cable connector 125 on the other end. When a home is not a subscriber as shown in FIG. 10B, a bypass jumper 129 is connected to both drop cable connectors 125. This allows the optical signal OS to pass through the terminal box 127 and continue along the optical fiber of the feeder optical cable 112. FIG. 10C illustrates the example of when a home becomes a subscriber. The bypass jumper 129 is removed and a drop cable 122 is connected to the terminal box 127 by way of drop cable connectors 125.

Figure 11:
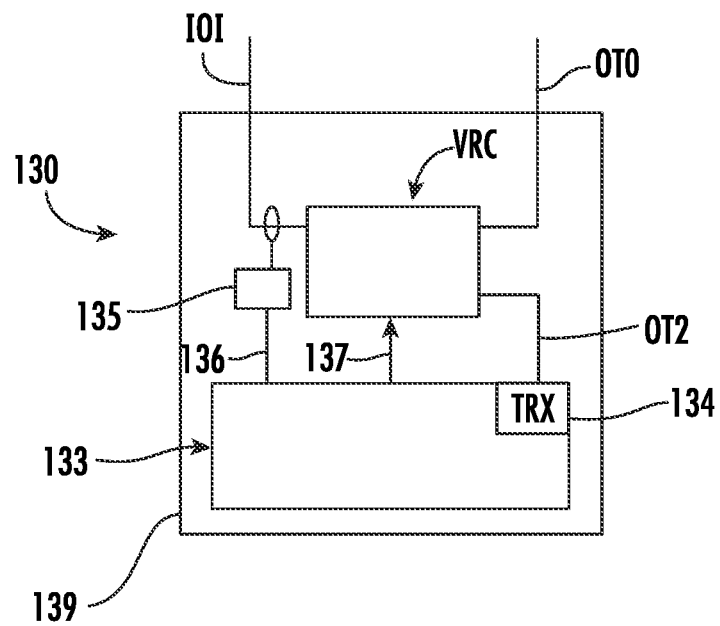
FIG. 11 schematically illustrates an example optical network unit according to one or more embodiments described and illustrated herein.

FIG. 11 schematically illustrates internal components of an example ONU 130 according to one or more embodiments of the present disclosure. The ONU 130 includes a housing 139 that defines an enclosure in which internal components are maintained. Like a traditional ONU, the example ONU 130 includes interface electronics 133 that includes an optical transceiver module 134. The interface electronics 133 are operable to convert optical signals into electrical signals and vice-versa so that electronic devices at the subscriber location may communicate over the network. The interface electronics 133 may include one or more controllers that are programmed to perform the functionalities of the interface electronics 133 described herein. The optical transceiver module 134 includes a laser for emitting optical signals and a photodiode for detecting optical signals. In some embodiments, the optical transceiver module 134 and the interface electronics 133 are provided in a single package or module. It should be understood that the interface electronics 133, the laser, the photodiode and all other transceiver electronics may be included in the same or separate, distinct modules.

The example ONU 130 further includes a VRC that provides an adjustable split ratio, as described above. An optical input OI is provided as an input into the VRC. A first optical output OT1 sends optical signals downstream on the feeder optical cable, and a second optical output OT2 provides optical signals between the OLT and the subscriber. The ONU 130 also includes an actuator 138, such as a servo motor, that is configured to mechanically adjust the VRC to properly set the split ratio.

In some embodiments, an optical power sensor 135 is provided to detect an optical power level of the input optical signal on the optical input OI. The optical power sensor 135 provides a power signal 136 to the interface electronics 133. The interface electronics 133 sends a control signal 137 to the actuator 138 (e.g., using a controller) based on the power signal 136 and thus the optical power level that is received by the ONU 130. Thus, the split ratio of the ONU 130 depends on the optical power that is detected.

In other embodiments, the optical transceiver module 134 and the interface electronics 133 determine the optical power of the input optical signal rather than using a dedicated optical power sensor. In such embodiments, during a set-up mode, the VRC may be set so that substantially all of the optical power of the input optical signal is provided on the second optical output OT2. The photodiode of the optical transceiver module 134 is configured to produce an electrical signal that is based on the amount of optical power. This electrical signal is provided to the interface electronics 133, which in turn produces a control signal to control the actuator such that the VRC has the proper split ratio. In this manner, the ONU 130 can automatically detect an incoming optical power, and automatically adjust its split ratio so that the subscriber receives the proper optical power level. In normal operation, the control signal will typically be set to give at least the minimum required signal powers at the optical transceiver module 134 and at the OLT. While the ONU received signal can be determined locally, the OLT will have to communicate with the ONU about the ONU transmit signal strength. As an example, the OLT may produce a calibration signal that is at a lower or higher frequency than the optical data frequency. A communication protocol between the OLT and the ONUs will provide for communication between the components whether the communication is done at a frequency that is the same or is different from the optical data frequency. The ONU may receive this calibration signal and adjust its transmit optical power accordingly.

Figure 12:
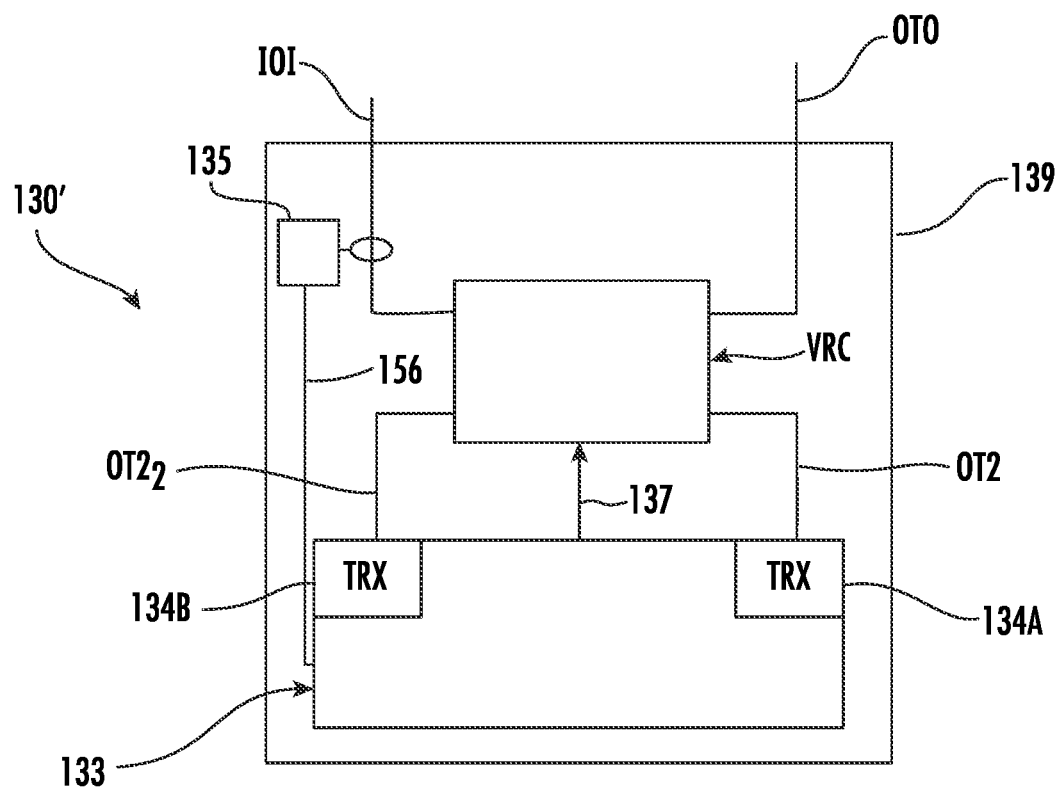
FIG. 12 schematically illustrates another example optical network unit according to one or more embodiments described and illustrated herein.

FIG. 12 illustrates another ONU 130' that is configured for bidirectional operation. In this example, the VRC is a 2×2 VRC meaning that it has two inputs and two outputs to enable communication in both directions. The example ONU 130' also includes a first optical transceiver module 134A and a second optical transceiver module 134B. In some embodiments, only one optical transceiver module is provided and an optical switch is used to switch between the input/output pairs of the 2×2 VRC depending on the intended communication direction.

Combined with a loopback of the fiber as shown in FIG. 9, the ONU shown in FIG. 12 enables a bidirectional system that can continue in the event of a number of different modes of system damage including a cut in any one drop cable or a disconnection of the optical fibers from the ONU at a subscriber location.

From an optical connectivity point of view, such a bidirectional system can be supported by two OLT ports at any point in the network, so a different or a temporary central office could be patched in to supply service in the event of a failure in the primary OLT.

Ideally, the VRC in either ONU type (i.e., unidirectional or bidirectional) will be latching, so that if the ONU is disconnected from electrical power (e.g., due to a general power failure at the premises, a failure in the ONU or deliberate or accidental disconnection of the ONU from electrical power), the setpoint will be preserved and the rest of the system will continue to function normally. This latched condition may be achieved by a brake or lock, which is engaged only when electrical power is lost. Alternatively, the VRC may be designed with a finite number of tap ratios, which are locked for example by a detent mechanism.

Alternatively, the VRC may be configured to move to a safe state in the event of ONU power loss, either mechanically or with the use of electrical power stored in a small battery in the ONU. The safe state could be a state of very low to essentially zero tapped power.

With either the unidirectional or bidirectional systems, if a subscriber wishes to be removed from the system, the drop from the cable can be replaced with a jumper and the setpoints of the VRCs in the remaining ONUs can be accordingly adjusted. Alternatively, the VRC can be set to drop essentially no optical power to the optical transceiver module of the ONU so that the ONU provides an almost lossless connection to downstream subscribers (i.e., the optical power outputted from the ONU to downstream subscribers is substantially equal to the optical power received by the ONU).

Other embodiments are possible. For example, the VRC can be provided with a method for manually setting the tap ratio to the required value when the passive optical network is initially set up or after it is reconfigured. The VRC can be designed as a "pluggable" unit that can be added to a range of ONUs. In this case it might contain its own received power detection and control electronics.

The passive optical network (PON) system management should take into account the presence of the variable attenuation in the optical path that is introduced by the use of VRCs in the ONUs as described herein.

Most of the principles involved in the system management are illustrated by the process for establishing the operating state for an ONU newly entering the PON. The most extreme case of this is powering up after a system shutdown, when all the ONUs need to re-establish connection.

To make the PON function correctly, the operating points of all the ONUs (i.e., their tap ratio setting) should be adjusted to ensure adequate signal levels throughout the PON.

One approach is to keep most or all of the control within the VRC. The VRC can incorporate a microcontroller that can adjust the VRC set point, using as a control signal a measurement of the strength of the signal from the OLT. This signal strength may be measured by a photodiode fed by a low-tap-ratio coupler within the VRC, or it may be information from the ONU obtained from the ONU's receiver module. For Next-Generation Passive Optical Network 2 (NG-PON2) systems, one option is for the ONU to provide information on the signal strength, since it has access to the level measured at the receiver module after it has passed through the tunable wavelength filter. The ONU may also provide one or more operating parameters to tell the VRC what signal power level is required.

More complex interfaces can be provided between the VRC and the ONU, or the VRC, ONU and OLT as described in detail below.

Figure 13:
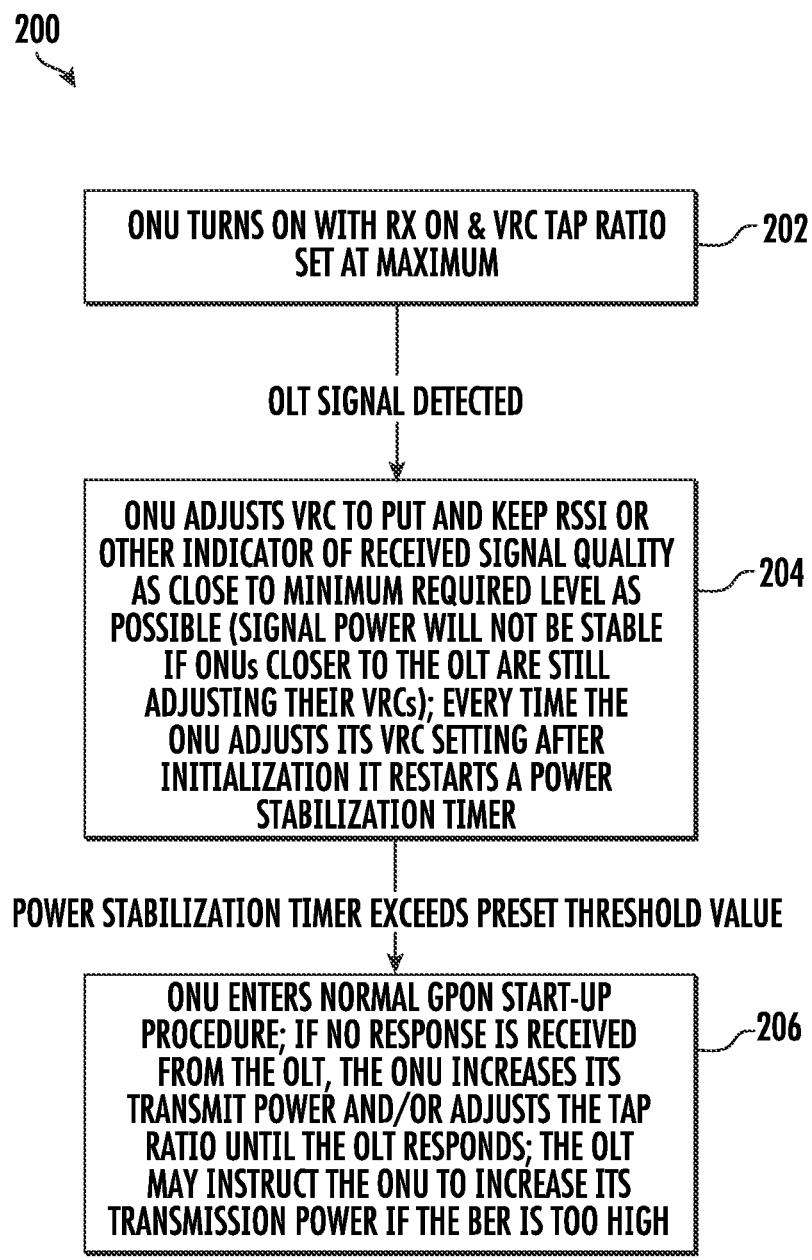
FIG. 13 illustrates an example method for managing variable ratio coupler settings according to one or more embodiments described and illustrated herein.

An example of one approach is provided in the flowchart 200 of FIG. 13, which does not require any additional functionality in the OLT. At block 202, upon powering up, the ONU sets its VRC to drop as much of the OLT optical signal power as possible. Thus, in this example, the ONU should have an internal capability to sense the VRC setting and map that onto tap ratio, or at least to the ability to drive the VRC setting to a maximum tap ratio. Once the ONU detects optical signal power received from the OLT, the process moves to block 204, wherein the ONU adjusts its VRC to set the OLT received signal strength indicator (RSSI) to the minimum required if the current power exceeds that value. Because other ONUs closer to the OLT may be doing the same adjustment, the ONU may have to adjust the VRC repeatedly to maintain the OLT RSSI. Each time the VRC is adjusted, the ONU restarts a power stabilization timer.

Once that timer reaches a predetermined value (e.g., chosen to ensure that any ONUs intervening between the OLT and the ONU under consideration have stabilized their VRC settings), the ONU begins the normal process of negotiating a connection with the OLT as determined by the gigabyte passive optical network (GPON), the Ethernet passive optical network (EPON) or any other system operating the PON (block 206). By design, all ONUs that can be provided on the system should after system set-up have more than the minimum RSSI available to them at their maximum tap setting, so all ONUs should adjust their VRCs at least once, and thus start the power stabilization timer. A failure to start the timer after a predetermined period can be designed to flag an error.

The stabilization time may depend principally on the VRC tuning speed, which may vary over a wide range depending on the actuation method, from mechanical deformation to solid-state electronic control.

For bidirectional ONUs, the ONU in the first stage decides on the signal direction. This can be done, for example, by examining the received signals on the two receiver modules (RX)— one RX will see relatively steady signal from the OLT, the other may see bursty traffic from ONUs further from the OLT.

The advantage of the above procedure is that the ONU does not attempt to establish a connection until it has stabilized; thus, the time taken to adjust the VRC does not have to be considered in setting time outs or quiet windows for the connection negotiation procedure.

While the procedure above allows the ONU to receive sufficient power from the OLT, it does not guarantee that the RSSI at the OLT from the ONU is adequate. If the ONU has information on the wavelength-dependence of the tap ratio at the downstream, and upstream wavelengths, and knows the absolute setting of the VRC, it can algorithmically select a VRC setpoint that increases the RSSI from the OLT in order to ensure that the tap ratio for its own transmissions is high enough to yield adequate signal strength at the OLT. However, the normal operating mode of the PON may be enough to manage this. For example, in GPON, when negotiating a connection with the OLT, the ONU may treat no response from the OLT as a failure to be heard and it will boost its transmission power and/or tap ratio. In normal GPON operation, the OLT monitors the bit error rate (BER) of the ONU signal and may, if necessary, ask the ONU to increase the power; the ONU can respond by adjusting its TX power and/or its VRC tap ratio, depending on its capabilities and current state.

Figure 14A:
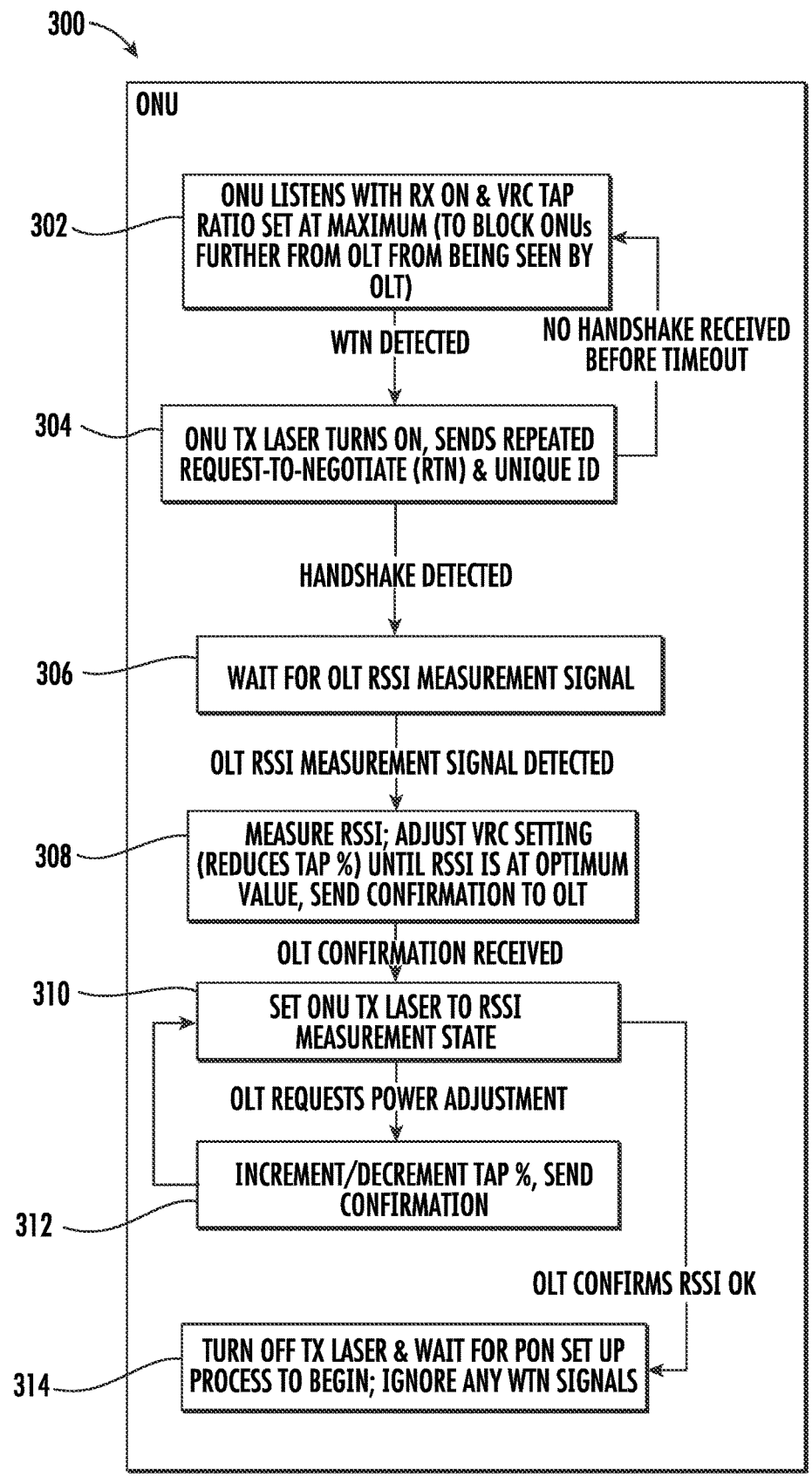
FIGS. 14A and 14B illustrate another example method for managing variable ratio coupler settings according to one or more embodiments described and illustrated herein.
Figure 14B:
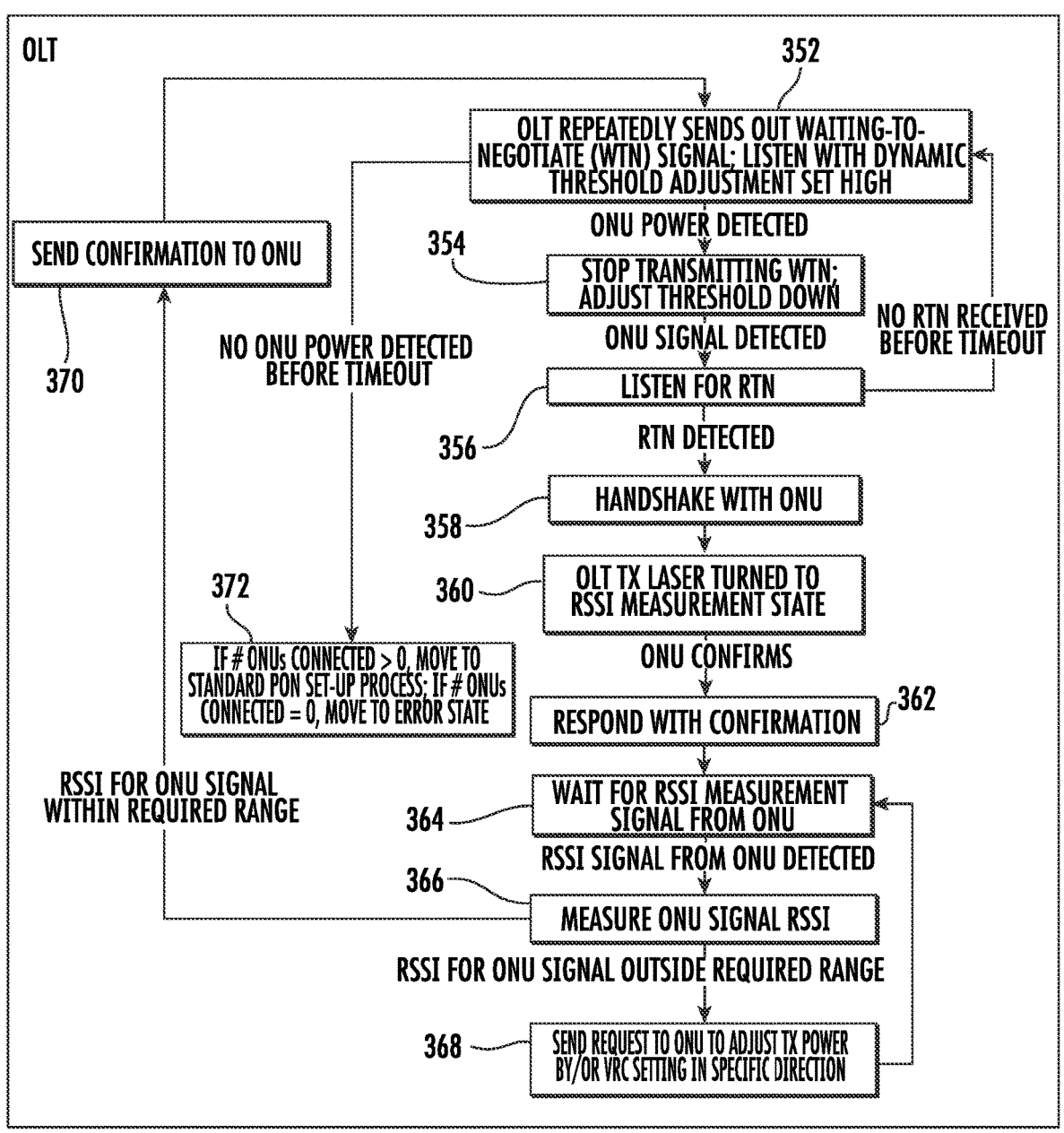

FIGS. 14A and 14B illustrate an alternative approach to setting the ONU VRC, which involves interaction with the ONU. In this example, the set up ensures that the signal powers in both directions meet but do not exceed the system requirements, thus optimizing the capacity and/or reach of the PON. Since this will occur before the standard PON communication channel between the OLT and the ONU is set up, this implementation may use a novel interface and a communication channel to be established. This channel can be unicast because the OLT is negotiating with one ONU at a time to set signal strengths.

FIG. 14A illustrates ONU process operations 300 and FIG. 14B illustrates ONT process operations 350.

Referring to FIG. 14A, at block 302 the ONU powers up and sets its VRC to maximize the tap ratio. This ensures that signals from ONUs further away from the OLT are heavily attenuated and so even if these more distant signals overlap in time at the OLT with signals from a closer ONU they will not interfere with the OLT's ability to detect signals from the closer ONU. After timing and frame synchronization to lock in on OLT transmissions the ONU monitors the OLT signal for a "waiting to negotiate" (WTN) message from the OLT.

When the ONU detects the WTN, the process moves to block 304 and the ONU sends a "ready-to-negotiate" (RTN) response and possibly other information including a unique ID which the OLT can use for addressing future messages in this initial PON set up process. The ONU then waits to receive a handshake message from the OLT. If the ONU receives no handshake, which may be because the OLT is dealing with a closer ONU, it goes back to listening mode in block 302.

After receiving the handshake, the ONU waits at block 306 for the OLT to transmit a signal that allows an RSSI measurement at the ONU. When the RSSI measurement signal is detected, the ONU process moves to block 308 where the ONU measures the RSSI, then adjusts the VRC tap ratio to reduce the RSSI to the minimum required level, and sends a confirmation to the OLT. This allows ONUs further down the line to interact with the OLT, but they will not do this until the OLT resumes transmission of the WTN signal. After sending the confirmation, the ONU waits for the OLT to respond with its own confirmation.

Having received this confirmation, the ONU process enters block 310 where the ONU begins to transmit an RSSI measurement state to the OLT, which measures the RSSI and may request adjustments to the VRC and/or the transmit (Tx) laser power until an acceptable upstream signal quality is achieved. Such a request for adjustment moves the ONU to block 312. If the OLT confirms that the RSSI (or other signal quality metric) is acceptable, the ONU process moves to block 314, where the ONU waits for the normal PON set-up procedure to begin. In this step, the ONU transmits no power and ignores any WTN messages.

While the ONU moves through the steps above the OLT traverses a corresponding process 350 illustrated by FIG. 14B.

At block 352, the OLT repeatedly sends out WTN signals, and listens for responses with its adjustable threshold for received signals set to high. When it detects power from one or more ONUs that are responding to its WTN signal, the ONT moves to block 354, ceasing transmission of the WTN and adjusting its threshold down until it can detect signals, which it will detect from the nearest transmitting ONU since the signals from more distant ONUs are heavily attenuated when passing through the VRC in the nearest one. Upon detecting a signal, the OLT process enters block 356, where after timing and frame synchronization it listens for an RTN from this ONU; if it does not receive an RTN in the allotted time, the OLT process returns to block 352.

Upon receipt of an RTN, the OLT process moves to block 358 where the OLT reads information from the ONU and sends a handshake message back to the ONU. The OLT process then goes to block 360, where the OLT turns its Tx laser on to a state suitable for RSSI measurements at the ONU.

When the ONU confirms that it has measured the RSSI and set its VRC accordingly, the OLT confirms such in block 362 then moves to block 364 where the OLT waits for an RSSI measurement signal from the ONU Tx laser. Having detected this signal, the ONT measures the RSSI in block 366. If the ONU Tx signal strength needs adjustment, the OLT process moves to 368, the OLT sends a request to the ONU and returns to block 364 to wait for a new RSSI measurement signal. If the ONU Tx signal is acceptable, the OLT sends a confirmation to the ONU in block 370 and goes back to block 352 where the OLT is ready to set up the VRC in the next nearest ONU.

If the OLT spends a specified time in block 352 without detecting power transmitted from an ONU, the OLT process moves to block 372 where if the number of ONUs already set up is non-zero, the OLT moves to the standard PON set-up (e.g. the GPON or EPON ONU discovery and registration process). If no ONUs have been detected, the OLT may declare an error state.

In some cases, it will be of value to allow detailed management of the VRC and the optical powers transmitted at the OLT and ONU, particularly if coordinated behavior of all the ONUs is required, or if monitoring for PON degradation is desired. In the case of a GPON system, for example, this could be realized using the PLOAM (Physical Layer Operations, Administration and Maintenance) and/or OCMI (ONU Management and Control Interface) communication channels. Use of the OCMI channel or equivalent will also facilitate the implementation of advanced capabilities such as enhanced energy efficiency by allowing laser power reduction in the OLT and/or ONU if all subscribers are operating with spare power budget, as may happen, for example, if the PON capacity is not fully utilized.

In the case of bidirectional ONUs, upstream traffic from ONUs further from the OLT is visible. Even in a system intended to use unidirectional ONUs, a malicious actor could in principle use a modified ONU that has a 2×2 VRC. To eliminate this security risk, the ONU-to-OLT traffic may be encrypted, which is standard in EPON systems but not in GPONs.

For the purposes of describing and defining the embodiments of the present disclosure, it is noted that the terms "approximately" and "substantially" are utilized herein to represent the inherent degree of uncertainty that may be attributed to any quantitative comparison, value, measurement, or other representation. The terms "approximately" and "substantially" are also utilized herein to represent the degree by which a quantitative representation may vary from a stated reference without resulting in a change in the basic function of the subject matter at issue.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:
1. A fiber optic network comprising:
a feeder optical cable operable to be optically coupled to an optical line terminal;
a first optical network unit and a second optical network unit, wherein each of the first optical network unit and the second optical network unit comprise:
a variable ratio coupler operable to selectively set a split ratio; and
a fiber optic transceiver module;
a first drop cable optically coupling the first optical network unit to the feeder optical cable at a first position; and
a second drop cable optically coupling the second optical network unit to the feeder optical cable at a second position, wherein a first split ratio of the first optical network unit is based on the first position and a second split ratio of the second optical network unit is based on the second position.

2. The fiber optic network of claim 1, wherein:
the first position is closer to the optical line terminal than the second position;
the first optical network unit provides a first downstream optical power and the second optical network unit provides a second downstream optical power; and
the first downstream optical power is greater than the second downstream optical power.

3. The fiber optic network of claim 2, wherein the variable ratio coupler of the first optical network unit and the second optical network unit are configured to change the split ratio of one or more of the first optical network unit and the second optical network unit upon an addition of one or more additional optical network units.

4. The fiber optic network of claim 3, wherein the first optical network unit and the second optical network unit each further comprise a controller operable to dynamically change the split ratio.

5. The fiber optic network of claim 2, further comprising a third optical network unit and a third drop cable optically coupling the third optical network unit to the feeder optical cable, wherein the variable ratio coupler provides a third split ratio.

6. The fiber optic network of claim 1, wherein the first optical network unit and the second optical network unit are electrically powered.

7. The fiber optic network of claim 1, further comprising a loop-back optical fiber optically coupled to the optical line terminal, wherein the loop-back optical fiber provides a protection path back to the optical line terminal.

8. The fiber optic network of claim 1, wherein the fiber optic network does not include a 1×N symmetric splitter.

9. The fiber optic network of claim 1, wherein the first optical network unit and the second optical network unit are configured for bi-directional communication.

10. A method of configuring a fiber optic network, the method comprising:
optically coupling an optical network unit to a feeder optical cable using a drop cable, wherein:
the optical network unit comprises:
a variable ratio coupler operable to automatically and selectively set a split ratio after being optically coupled to the feeder optical cable; and
a fiber optic transceiver module; and
installing the optical network unit at a subscriber location.

11. The method of claim 10, wherein the split ratio is automatically selected based on a number of additional optical network units optically coupled to the feeder optical cable.

12. The method of claim 11, wherein the split ratio is further automatically selected based on a position of the optical network unit with respect to any additional optical network units optically coupled to the feeder optical cable.

13. The method of claim 10, further comprising optically coupling an additional optical network unit to the feeder optical cable using an additional drop cable, wherein the additional optical network unit comprises an additional variable ratio coupler operable to automatically and selectively set an additional split ratio automatically change the split ratio of the variable ratio coupler of the optical network unit.

14. The method of claim 10, further comprising removing the optical network unit from the fiber optic network by setting the split ratio such that a downstream optical power of the optical network unit is substantially equal to optical power entering the optical network unit.

15. The method of claim 10, wherein the optical network unit is configured for bi-directional communication.

* * * * *